Aug. 14, 1962    H. Y. KUHL ETAL    3,049,135
EGG CLEANER
Filed May 26. 1959    2 Sheets-Sheet 1
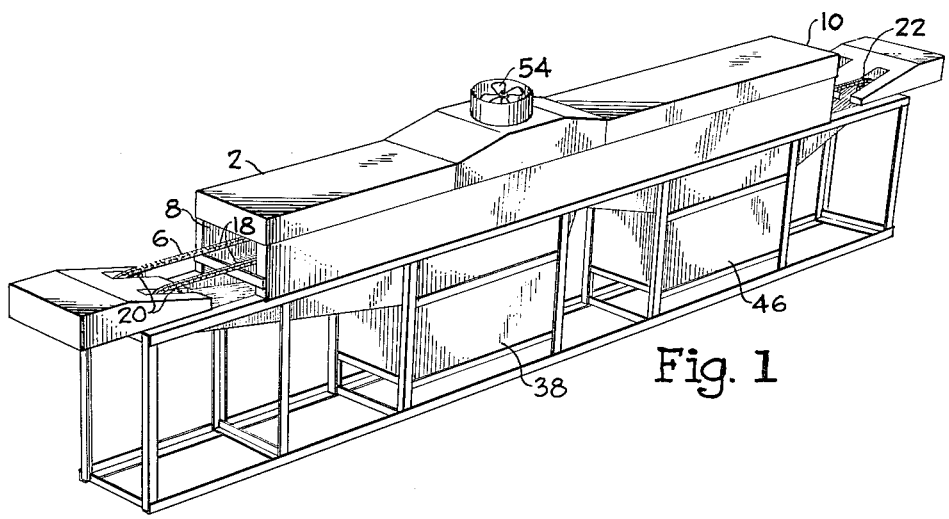
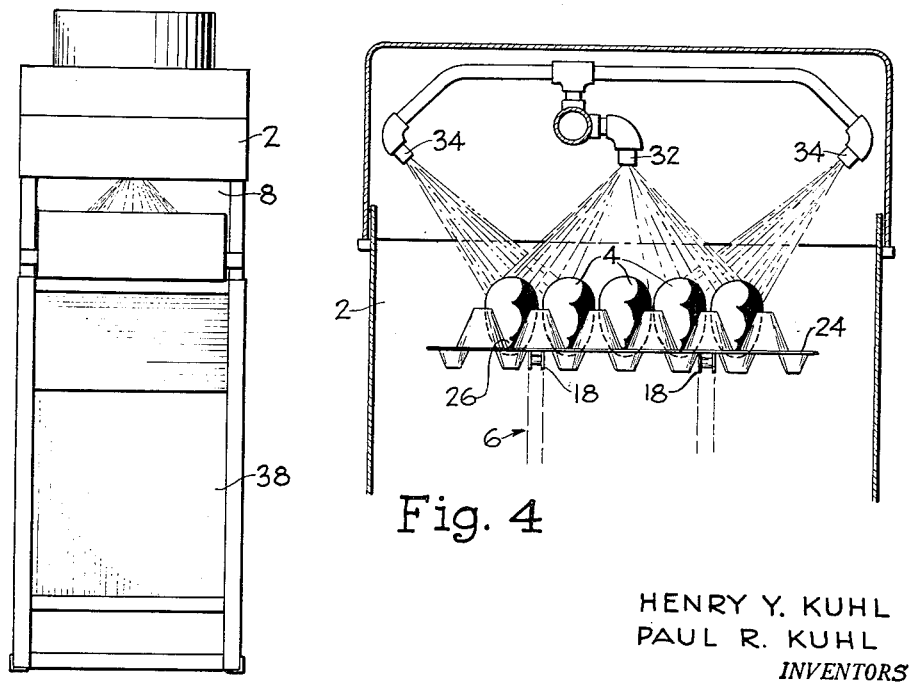
HENRY Y. KUHL
PAUL R. KUHL
INVENTORS
BY *Albert Sperry*
ATTORNEY

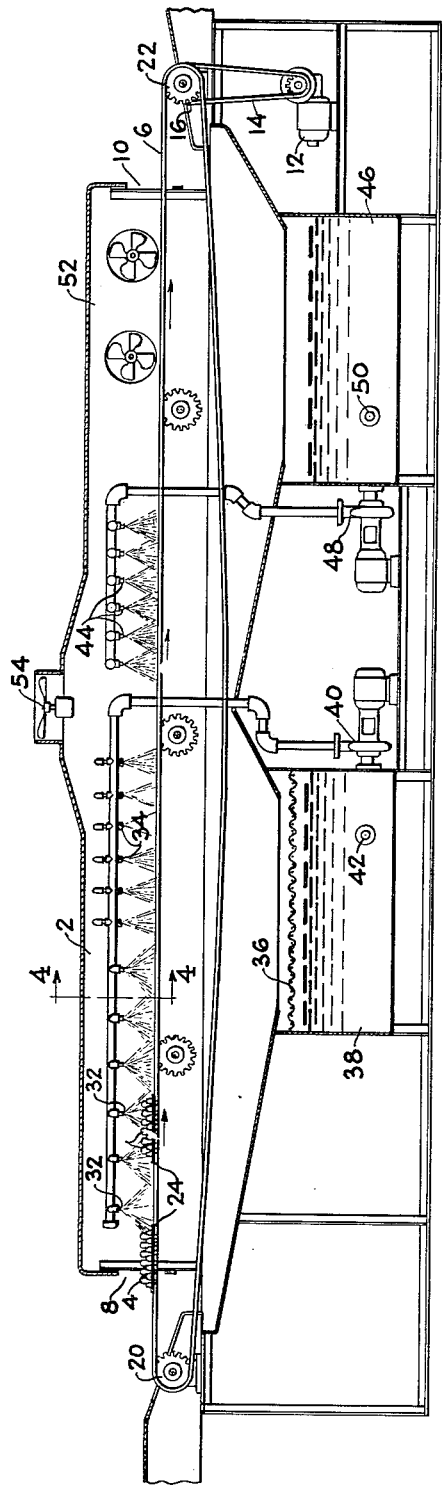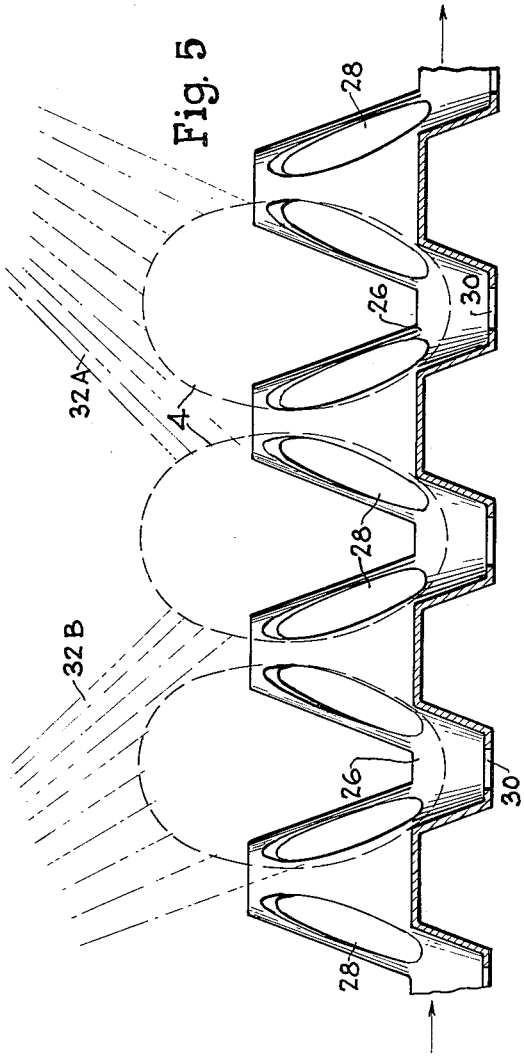
HENRY Y. KUHL
PAUL R. KUHL
INVENTORS
BY Albert Sperry
ATTORNEY United States Patent Office 3,049,135
Patented Aug. 14, 1962

3,049,135
EGG CLEANER
Henry Y. Kuhl and Paul R. Kuhl, both of Copper Hill-Reaville Road, Flemington, N.J.
Filed May 26, 1959, Ser. No. 815,841
2 Claims. (Cl. 134—72)

This invention relates to equipment for cleaning eggs and is directed particularly to constructions whereby eggs may be subjected to sprays of liquid while supported in a manner to assure effective cleaning thereof.

It has been common practice heretofore to wash eggs by submerging them in a bath of cleaning liquid which may be agitated. However, such treatment does not always clean eggs effectively and in some instances the eggs may be damaged because the liquid employed is too hot or the treatment is prolonged excessively. It has also been suggested that eggs be cleaned by the use of brushes to which liquid may or may not be supplied but such treatment is sometimes so vigorous as to displace or move the eggs sufficiently to cause them to crack or break while being cleaned.

In accordance with the present invention, these objections and limitations of prior egg cleaning equipment are overcome and means are provided whereby the eggs may be effectively cleaned while damage to the eggs is substantially prevented.

These advantages are attained by arranging the eggs in a predetermined manner upon a perforated support whereon they are subjected to vigorous sprays of cleaning and rinsing liquid as they travel through the equipment. The eggs need not be subjected to any mechanical treatment although they may move with respect to the support. However, the scrubbing action of high speed films of liquid serves to assure the removal of dirt therefrom. At the same time, the manner of application of the liquid is such as to prevent damaging of the eggs even when the liquid is heated to an elevated temperature. Since the films of liquid tend to evaporate while in contact with the eggs whereby localized cooling takes place and the eggs are protected against overheating.

Accordingly, the principal object of the present invention is to clean eggs in an effective manner while avoiding damage thereof.

Another object of the invention is to subject eggs to vigorous sprays of liquid while the eggs are arranged in a predetermined manner on a perforated support.

A specific object of the invention is to control the temperature and manner of application of sprays of liquid to eggs in such a way as to assure effective cleaning thereof without damaging the eggs.

These and other objects and features of the present invention will appear from the following description thereof wherein reference is made to the figures of the accompanying drawing.

In the drawing:

FIG. 1 is a perspective illustrating a typical form of egg cleaning equipment embodying the present invention;

FIG. 2 is a longitudinal sectional view through the equipment of FIG. 1;

FIG. 3 is an end view of the constructions of FIGS. 1 and 2 as seen from the inlet end of the equipment;

FIG. 4 is an enlarged view of the inlet portion of the equipment of FIG. 1 showing preferred means for supporting and moving the eggs;

FIG. 5 is a sectional view showing a portion of a preferred type of egg supporting tray and the manner of application of the washing liquid;

In that form of the invention chosen for purposes of illustration in the drawings, the equipment is designed for continuous operation and is provided with a tunnel or housing 2 through which the eggs 4 are moved by conveying means 6 from the inlet end 8 of the tunnel to the outlet end 10 thereof. The conveying means 6 preferably is driven continuously by a motor 12 and a driving chain or belt 14 which passes about a sprocket or pulley 16 located near the outlet end of the tunnel.

The conveying means 6 preferably consists of a pair of spaced chains 18 which pass about sprockets 20 and 22 located near the inlet and outlet ends respectively of the tunnel 2. The eggs are supported upon perforated means which preferably are in the form of egg receiving trays 24 such as those shown and described in our issued Patent No. 3,000,528.

Such trays are formed of plastic or other material which will not be damaged by water or cleaning liquid and are provided with longitudinally and transversely arranged rows of egg receiving cavities 26. The cavities are spaced a predetermined distance apart and the chains 18 of the conveying means are so spaced as to permit the trays to be placed on the chains with the chains located between parallel rows of cavities. The trays can thus be placed on and removed from the conveying means without difficulty whereas they are effectively held in place and prevented from moving relative to the conveying means during movement thereof through the tunnel 2.

The egg receiving cavities 26 of the trays 24 are provided with relatively large laterally facing openings 28 and with downwardly facing openings 30 whereby water and sprays of liquid may enter the cavities and engage and flow about the lower portions of the eggs and yet will drain freely and quickly from the eggs and cavities so that liquid will not remain in contact with the eggs. The upper portions of the eggs are, of course, exposed for direct contact of liquid therewith.

The liquid employed for cleaning the eggs is preferably water to which a suitable detergent has been added and is sprayed forcibly downward onto the eggs carried by the trays and conveying means from spray nozzles 32 arranged near the top and central portion of the tunnel 2. Additional spray nozzles 34 may be positioned at the sides of the tunnel 2 to project cleaning liquid laterally onto the eggs and through the openings in the cavities of the trays 24.

In the preferred arrangement of the nozzles 32 and 34, the nozzles 32 are arranged closest to the inlet end 8 of the tunnel and are formed to direct conical sprays of liquid downward onto the eggs. As shown in FIG. 5, the eggs approaching a nozzle 32A are subjected to an intense inclined spray projected against the front and top surface of the eggs and the spray penetrates downward about the lower portions of the eggs where they are exposed through the openings 28 in the sides of the cavities 26 of the tray. Thereafter, as the eggs pass on beyond the nozzle 32A they are subjected to a spray projected against the top and rear surfaces of the eggs, as indicated by the nozzle 32B in FIG. 5. At the same time the eggs in both the central and marginal cavities of the trays are subjected to laterally inclined portions of the conical spray assuring cleaning of the inwardly facing sides thereof. A series of the nozzles 32 is provided and the cones of spray preferably intersect or partially overlap so that such spray cleaning is repeated several times on each egg as it passes beneath the nozzles 32.

In addition to the action of the nozzles 32, the eggs are subjected to the action of cleaning fluid projected laterally from the nozzles 34. The latter nozzles may be positioned in the same zone of the tunnel as the nozzles 32 but as shown are preferably located in a central zone of the tunnel whereby the sprays from jets 32 will not oppose or interfere with the sprays from jets 34. The jets 34 are preferably designed to produce a fan type spray which is directed onto the eggs both above and below the upper surface of the trays and against the opposite sides of the eggs.

In this way, each egg is subjected to the action of an intense spray of cleaning liquid projected against the front, rear, top and opposite sides of the eggs whereby the eggs are not simply contacted with liquid but are scrubbed by films of liquid travelling at high speed across the surface of the eggs in alternate or changing directions. In this way the sprays serve to loosen and remove the most stubbornly adhering dirt. Moreover, by arranging the eggs in an orderly manner, and preferably in longitudinally and transversely extending spaced rows upon the trays 24, the eggs are uniformly exposed to the sprays of liquid during their passage through the tunnel.

The detergent liquid draining from the eggs and trays is preferably passed through a screen 36 and collected in a tank 38 from which it is returned to the nozzles 32 and 34 by a pump 40. A heating element 42 may be located in a tank to maintain the liquid supplied to the nozzles at a desired high temperature.

The eggs which have been washed by detergent from the nozzles 32 and 34 are carried on past these nozzles by the conveying means to a rinsing zone where they are subjected to downwardly directed sprays of clean rinse water from nozzles 44. These nozzles may be arranged in rows extending longitudinally and transversely of the tunnel near the outlet end 10 thereof or the nozzles may be otherwise disposed in any way which will assure effective rinsing of the eggs to remove the detergent liquid therefrom.

The wash water draining from the eggs and trays in the rinsing zone of the tunnel is collected in the tank 46 and returned to the nozzles 44 by a pump 48. A heating element 50 is preferably located in the tank 46 to maintain the rinse water at a desired high temperature.

The equipment thus provided renders it possible to clean eggs more effectively than they can be cleaned by immersion processes since the velocity at which the liquid can be projected against the eggs when in the form of droplets or a spray can be increased far beyond that which could be safely used in submerged washing when circulating or projecting a body of flowing liquid against the eggs. The scrubbing and cleaning effect is thus markedly increased without danger of injury to the eggs.

The present invention further renders it possible to utilize cleaning and rinsing liquids which are at temperatures much higher than would be possible if the eggs were submerged in the liquid. This is possible by reason of the fact that the sprays of liquid upon engaging the eggs are converted into very thin films of liquid which travel at high speed over the surfaces of the eggs. Such films of liquid tend to evaporate much more rapidly than a body of liquid and as a result localized evaporation takes place directly in contact with and adjacent the eggs as they are being cleaned. Thus, it is possible to heat the detergent liquid to temperatures of 140° or to other high temperatures which would tend to cook or damage eggs immersed therein. However, the eggs are not heated to any such temperature since the evaporation which takes place in the films of liquid actually contacting the eggs serves to offset or counteract the heating effect which the liquid would otherwise have. The applicant's spray cleaning equipment thus utilizes the well known principal employed in industrial water cooling and condensing apparatus for the purpose of safeguarding the eggs from excessive temperatures while subjecting the surface of the eggs and the dirt thereon to the intense scrubbing and cleaning action of high temperature liquid flowing at high speed over the surfaces of the eggs.

If it is desired further to assure evaporation of the liquid to prevent damage to the eggs, the tunnel 2 may be provided with an exhaust fan or blower 54 which serves to cause air to flow in through the ends of the tunnel and across the eggs as they are being scrubbed. However, such exhaust means is not always required. In some instances, the top of the tunnel is removed while in most cases, the evaporation is sufficient to prevent damage to the eggs and the tunnel actually is used to conserve heat and prevent undue cooling of the liquid.

The water used in rinsing the eggs may also be heated to a relatively high temperature but it drains and evaporates off from the eggs so they emerge from the outlet end 10 of the tunnel 2 in a clean substantially dry condition. Nevertheless, the eggs may, if desired, be passed on through a cooling and further drying chamber indicated at 52, if desired.

One of the advantages inherent in the present invention resides in the fact that the eggs to be cleaned can be carried through the equipment on trays whereon they have been placed previously when collected. Accordingly, they may be removed and transported directly to egg grading or candling equipment or placed in crates or elsewhere without actually touching the eggs. The equipment, therefore, reduces the amount of handling to which the eggs are subjected so that breakage of eggs is reduced to a minimum. The present invention also lends itself to usage in egg handling establishments wherein large volumes of eggs are handled by automatic equipment and moved continuously from one operation to another in a systematic manner.

While the egg cleaning equipment shown in the drawings and described above is typical and preferred, it will be apparent that numerous changes and modifications may be made in the form, construction, and arrangement of the elements without departing from the teachings of the present invention. In view thereof, it should be understood that the embodiment of the invention described is intended to be illustrative only and is not intended to limit the scope of the invention.

We claim:

1. Egg cleaning equipment comprising a chamber, a conveyor, means for moving said conveyor longitudinally in said chamber, an egg tray separable from the conveyor and provided with spaced egg receiving recesses projecting downwardly from the tray, said conveyor having portions thereof positioned in the spaces between the downwardly projecting recesses on the trays and operable to prevent lateral displacement of the trays with respect to the conveyor during movement of the trays through said chamber, and means in said chamber for passing washing liquid into contact with eggs supported by a tray located on the conveyor.

2. Egg cleaning equipment comprising a chamber, a conveyor, means for moving said conveyor longitudinally in said chamber, an egg tray separable from the conveyor and formed of a material which will not be damaged by cleaning liquid employed in cleaning eggs, said egg tray being provided with longitudinally and transversely arranged rows of egg receiving cavities which project downwardly from the upper surface of the tray and present longitudinally and transversely extending channels therebetween on the lower surface of the egg tray, said conveyor including elongated portions positioned in the channels between the rows of cavities projecting downward from the bottom of the tray and serving to prevent displacement of the egg tray with respect to the conveyor, and means in said chamber for passing washing liquid into contact with eggs supported in the cavities of a tray located on the conveyor.

References Cited in the file of this patent

UNITED STATES PATENTS

| | | |
|---|---|---|
| 1,406,465 | Lynch | Feb. 14, 1922 |
| 1,720,622 | Breton | July 9, 1929 |
| 2,250,238 | Smith | July 22, 1941 |
| 2,385,264 | Ferris | Sept. 18, 1945 |
| 2,412,565 | Davis | Dec. 17, 1946 |
| 2,633,437 | Detjen | Mar. 31, 1953 |
| 2,673,515 | Johnson | Mar. 30, 1954 |
| 2,698,627 | Kearney | Jan. 4, 1955 |
| 2,714,257 | Reading | Aug. 2, 1955 |
| 2,754,834 | Merancy | July 17, 1956 |
| 2,756,759 | Swain | July 31, 1956 |